G. R. HALL.
SELF ADJUSTING SHOVEL.
APPLICATION FILED APR. 7, 1917.

1,264,640.

Patented Apr. 30, 1918.

Inventor:
George Ralph Hall

UNITED STATES PATENT OFFICE.

GEORGE RALPH HALL, OF COLCHESTER, ILLINOIS.

SELF-ADJUSTING SHOVEL.

1,264,640.

Specification of Letters Patent.

Patented Apr. 30, 1918.

Application filed April 7, 1917. Serial No. 160,484.

*To all whom it may concern:*

Be it known that I, GEORGE RALPH HALL, a citizen of the United States, residing at Colchester, in the county of McDonough and State of Illinois, have invented new and useful Improvements in Self-Adjusting Shovels, of which the following is a specification.

The invention relates to a shovel, and more particularly to the class of self-adjusting shovels.

The primary object of the invention is the provision of a shovel of this character wherein the user of the same is relieved of the necessity of using hooks or scrapers in cleaning out furnaces, ash pans, and saw dust pits, or other places where a rigid handled shovel could not be satisfactorily used.

Another object of the invention is the provision of a shovel of this character which is extremely simple in construction, reliable and efficient in its purpose, strong, durable, and inexpensive in manufacture.

Other objects will be in part obvious and in part hereinafter pointed out.

The invention accordingly consists in the features of construction, combination of elements, and arrangement of parts which will be exemplified in the construction hereinafter set forth, and the scope of the application of which will be indicated in the following claim.

Figure 1:
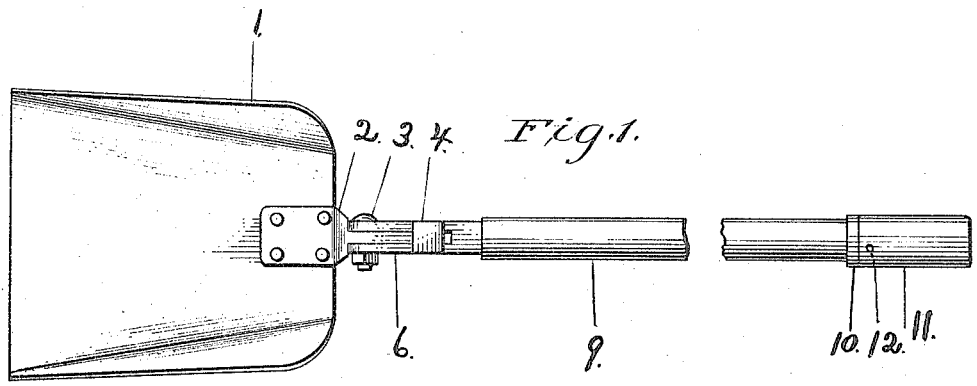
Figure 2:
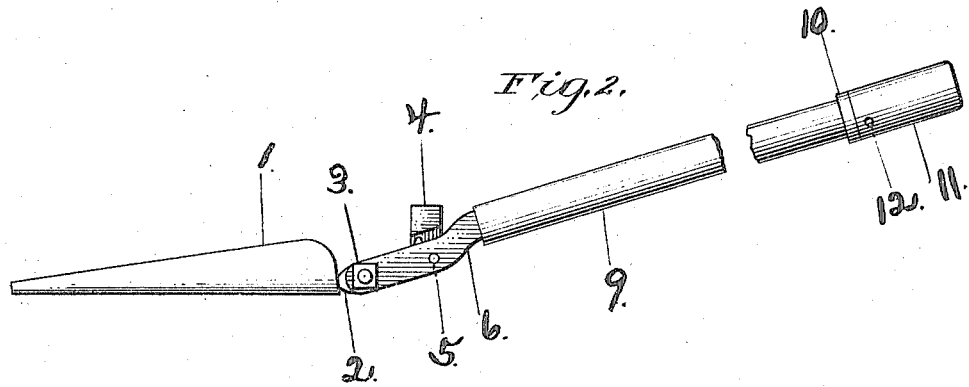
Figure 3:
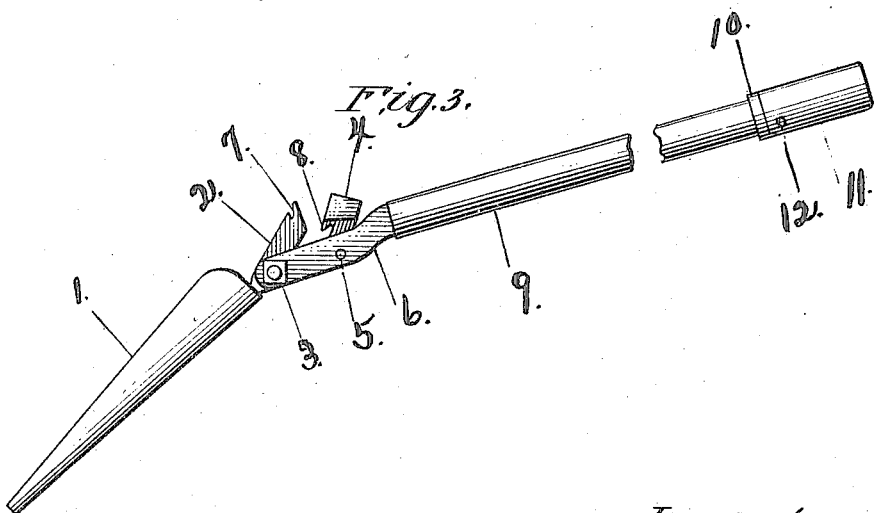

In the drawing:—Figure 1 is a plan view of a shovel constructed in accordance with the invention. Fig. 2 is a fragmentary longitudinal sectional view thereof. Fig. 3 is a side view showing the shovel in adjusting position.

Similar reference characters indicate corresponding parts throughout the several views in the drawing.

Referring to the drawing in detail the shovel consists of a blade 1 made of shovel steel with a shank 2 cast with the blade or attached thereto. Shank 2 has a notch or hook 7. 6 is a steel curved fork in the shape of a tuning fork. 9 is a hollow steel handle preferably made of steel, although it may be made from other material and of any desirable length to suit the fancy of the user. 11 is a wooden grip bored to slip on handle 9 and is secured to handle by a rivet 12. 10 is a metal ferrule on the end of grip to prevent splitting.

The fork 6 is driven into the handle 9. 4 is a pawl pivotally secured to fork 6 by a rivet or bolt 5. Shank 2 is pivotally secured to fork 6 by bolt 3 permitting blade 1 to assume position shown in Fig. 3. 8 is a hook or notch cut to engage with the hook 7 on shank as shown in Fig. 2.

*Operation.*

Taking the shovel in both hands, as is ordinarily done in the position shown in Fig. 2, press the pawl 4 against the top of ash or fire box door which unlocks hooks 7 and 8 thereby permitting the shovel to assume the position shown in Fig. 3, which allows the shovel to follow the floor. When loaded the handle is raised to original position as at Fig. 2 when the shank 2 falls into its place in fork and is hooked automatically the pawl 4 falling forward thereby engaging hooks 7 and 8. To empty, proceed as with any other shovel.

From the foregoing description taken in connection with the accompanying drawing, the construction and manner of operation of the device will be clearly understood, and therefore a more extended explanation has been omitted.

What is claimed is:—

A device of the character described comprising a handle, a forked member extending therefrom, a shovel blade provided with a flat shank pivotally mounted in the forked member, a pawl also pivoted within the forked member and having a head projecting above the fork and interlocking means on the shank and the pawl adapted to be disengaged by striking the pawl head and reëngaged by movement of the handle.

In testimony whereof I affix my signature.

GEORGE RALPH HALL.

Copies of this patent may be obtained for five cents each, by addressing the "Commissioner of Patents, Washington, D. C."